Feb. 21, 1950     W. J. STEEN     2,498,053
CAPACITOR HOUSING
Filed Oct. 7, 1947

Inventor
WILLIS J. STEEN

By
*J. D. O'Brien*
Attorney

Patented Feb. 21, 1950

2,498,053

UNITED STATES PATENT OFFICE 2,498,053

CAPACITOR HOUSING

Willis J. Steen, Chicago, Ill., assignor to the United States of America as represented by the Secretary of the Navy Application October 7, 1947, Serial No. 778,442

1 Claim. (Cl. 173—324)

The present invention relates to a capacitor and to a process of making the same. More particularly it relates to a metal-incased, annular capacitor and to a process of making the same whereby the capacitor is hermetically sealed.

An object of the invention is to provide an annular capacitor which is hermetically sealed in a casing to prevent the entrance therein of dirt, moisture and corrosive gases, and to protect it from mechanical injury.

Another object of the invention is to provide a hermetically sealed, metal-incased, annular capacitor in which the terminals are similarly sealed hermetically to the metal case by means of sleeves, which also insulate the said terminals electrically from the metal enclosure.

Another object is to provide an efficient process of making such enclosures, sealing the capacitor elements therein, and providing terminals which are not only hermetically sealed to the enclosures but also insulated electrically therefrom.

A still further object is to provide an improved capacitor, simple in construction, economical of manufacture and effective in operation.

Other objects and advantages of the invention will become apparent from the following description, taken in connection with the accompanying drawing, and it will be understood that many changes may be made in the arrangement and details of parts described without departing from the spirit of the invention as set forth in the accompanying claims. I, therefore, do not wish to be limited to the exact details shown and described, as the preferred form only has been shown by way of illustration.

Figure 3:
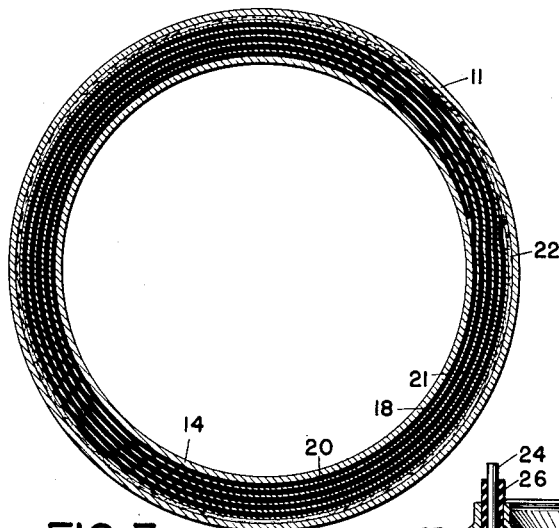
Figure 3 is a sectional view taken on line 3—3 of Figure 2.

The capacitor herein described and illustrated comprises a capacitor element 17 encased in a housing formed from two cylindrical members 10 and 13. The outer member 10 is preferably a seamless-drawn metal cylindrical shell 11, open at both ends, and having an integral, inwardly-extending flange 12 at its base. The inner member 13 is likewise preferably a seamless-drawn metal cylindrical shell 14, open at both ends, and having an integral, outwardly-extending flange 15 at its base. The outer diameter of the flange 15 is sufficiently less than the bore of the shell 11 to permit the two members 10 and 13 to be assembled as shown in Figure 2.

Figure 2:
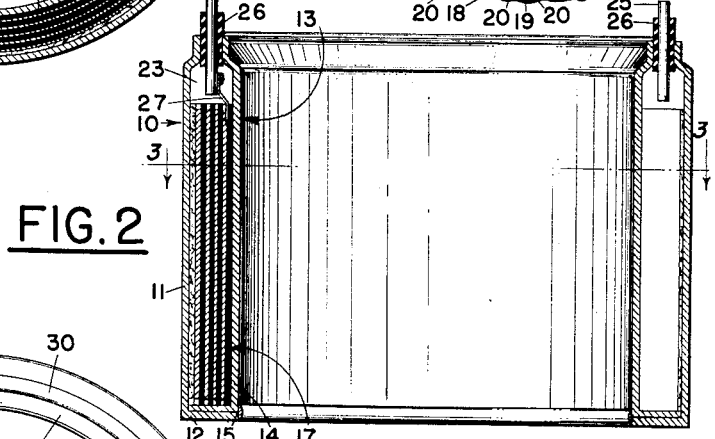
Figure 2 is a sectional view taken on line 2—2 of Figure 1.
Figure 1:
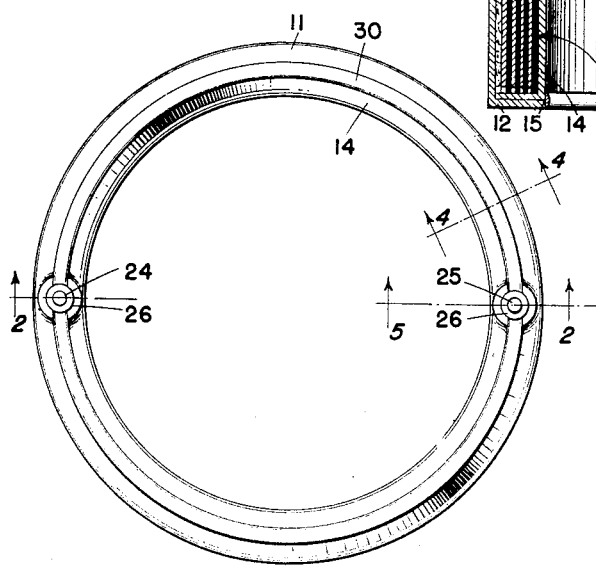
Figure 1 is a top plan view of a capacitor embodying the present invention.

The two flanges may be secured to one another in any suitable manner and preferably by soldering along the edge at 15 as noted in Figure 2. As an alternative the flanges may be welded by either a continuous weld or by spot welding. In the latter event a suitable coating would have to be applied along this edge, if a hermetic seal is required.

The capacitor element 17 itself consists of two continuous strips of conducting material or foils 18 and 19 alternating with two strips of dielectric 20 and 21 which are wound to form a hollow cylinder that will fit into the annular space between the shells 11 and 14. While two complete windings are illustrated in Figure 3, it should be understood that the accompanying drawing is diagrammatic and that any number of such windings may be employed, as desired. In order to secure a capacitor that is as compact as possible, it is preferred to wind the conducting foils 18 and 19 with the interposed dielectric strips 20 and 21 directly upon the outer surface of the cylindrical shell 14. When utmost compactness is not of paramount importance, however, it may be found expedient to assemble capacitor element 17 before inserting it into the housing or metal container, which in that case may be finished previously.

The foils, 18 and 19 are preferably so interposed between the dielectric strips 20 and 21 that the lower edges of the foils do not extend as far as the dielectric strips, whereby the lower edges of the latter serve as spacers to preclude contact between the lower edges of the foils and the base of the metal container. As an alternative construction, the bottom edges of the conducting strips and the interposed dielectrics may be made flush and short circuiting of the capacitor foils through the metal container prevented by coating at least the lower part of the capacitor 17 with some appropriate material such as paraffin. Similarly, the outer layer 19 of the capacitor assembly is insulated from the metal outer shell 11 of the housing by an outer winding of paper 22 or some other suitable dielectric. The inner layer of the capacitor assembly 17 being the dielectric 20, the capacitor is thereby insulated from the metal inner shell 14 of the housing without the need of any additional winding or coating.

Figure 5:
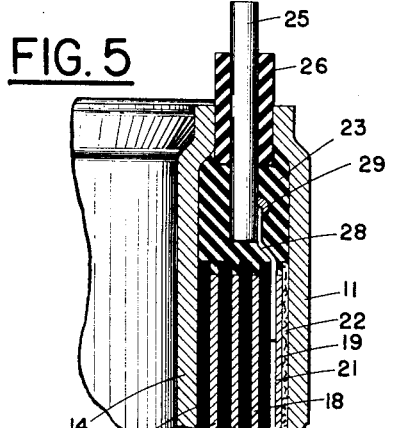
Figure 5 is a enlarged sectional view, similar to Figure 4, but taken, however, through one of the terminals.

Two terminals 24 and 25 extend from within the metal container and are insulated therefrom by the tubes 26 of glass or plastic through which they pass. The terminal 25 makes electrical contact with the conducting strip 19 through the connector strip 28. The connector 28 extends from a connection with the terminal 25, as by the solder joint 29 illustrated in Figure 5, downwardly between the windings of the dielectric 21 and the foil 19. The pressure of the windings is ordinarily sufficient to retain the connector strip in position and in electrical contact with the conducting foil 19. The terminal 24 is similarly connected to the foil 18 by means of the connector 27. As an alternative construction, the terminals themselves may extend downwardly between the windings of the capacitor, thereby eliminating the connector strips 27 and 28.

Figure 4:
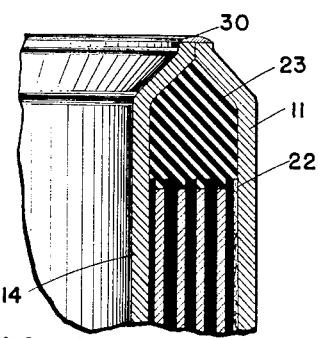
Figure 4 is an enlarged detail sectional view taken on line 4—4 of Figure 1, illustrating the sealing and insulating arrangement for the upper edge of the capacitor.

A suitable plastic insulating material 23 is applied to the upper edge of the capacitor element 17 to seal it and to insulate the top edges of the conducting foils 18 and 19. The terminals 24 and 25 and the connector strips, if employed, projecting through the material 23, are similarly insulated thereby. The upper edges of the cylindrical shells 11 and 14 are bent or crimped together, the joint being made tight by solder 30, as illustrated in Figure 4. Where the terminals 24 and 25 emerge from the metal housing, the upper edges of the cylindrical shells are similarly crimped about the insulating tubes 26 through which the terminals extend.

It is apparent that, while the capacitor housing of the embodiment of the invention described and illustrated is disclosed as being composed of metal, the housing members 10 and 13 may be constructed of plastic or some material other than metal, similarly secured to each other and sealed by conventional means.

I claim:

A metal housing for a capacitor, including a pair of cylindrical members, one of said members comprising an outer shell and the other an inner shell, flanges at the corresponding lower ends of the cylindrical members and extending towards each other and in overlapping relation, means for fastening and hermetically sealing said flanges together to define a closure for the lower end of the housing, an insulating composition in the upper end of the housing to insulate a capacitor in said housing from the metal housing, a pair of terminals projecting through the insulating composition, an insulating tube about each of the terminals, the upper edge portions of said members being crimped together and about said insulating tubes, and a bead fastening and hermetically sealing said crimped edges together.

WILLIS J. STEEN.

REFERENCES CITED

The following references are of record in the file of this patent:

UNITED STATES PATENTS

| Number | Name | Date |
| --- | --- | --- |
| 2,029,550 | Albert | Feb. 4, 1936 |